United States Patent

[11] 3,548,118

[72] Inventor Kenneth J. Hutchings
Soquel, Calif.

[21] Appl. No. 839,016
[22] Filed July 3, 1969
[45] Patented Dec. 15, 1970
[73] Assignee Pacific Plantronics, Inc.
Santa Cruz, Calif.
a corporation of California

[54] SELF-SUPPORTING HEADSET
7 Claims, 4 Drawing Figs.

[52] U.S. Cl. 179/156
[51] Int. Cl. H04m 1/05
[50] Field of Search 179/156

[56] References Cited

UNITED STATES PATENTS

| | | | |
|---|---|---|---|
| 2,904,640 | 9/1959 | Dreher et al. | 179/156 |
| 3,184,556 | 5/1965 | Larkin | 179/156 |
| 3,280,273 | 10/1966 | Flygstad | 179/156 |
| 3,440,365 | 4/1969 | Bryant et al. | 179/156 |
| 3,457,376 | 7/1969 | Kreisel et al. | 179/156 |

*Primary Examiner*—William C. Cooper
*Attorney*—Flehr, Hohnach, Test, Albritton & Herbert

ABSTRACT: A self-supporting headset having a housing which accommodates a receiver and microphone. A flexible acoustic tube adapted to communicate between the auditory canal of the ear of the user and the receiver secured to the bottom of the housing, and an adjustable acoustic tube secured to the top of the housing with its distal end adapted to be disposed adjacent the mouth of the user to transmit sound to the microphone.

KENNETH J. HUTCHINGS
INVENTOR.

BY Fleit, Gipple ... & Jacobson ... (signature)
ATTORNEYS

PATENTED DEC 15 1970

3,548,118

KENNETH J. HUTCHINGS
INVENTOR.

BY

ATTORNEYS

SELF-SUPPORTING HEADSET

BACKGROUND OF THE INVENTION

This invention relates generally to headsets and more particularly to headsets which contain a microphone and receiver and are adapted to be supported solely from the ear of the user.

Some prior art headsets have included various intermediate supporting structures for supporting the headset in cooperative relationship with the ear and mouth of the user. Such structures have included head bands and means for attachment to the temple of eyeglasses. These structures have been rather cumbersome. Others have included ear molds for supporting the headset from inside the ear. This necessitates fitting of the ear mold to individual users.

SUMMARY OF THE INVENTION AND OBJECTS

It is a general object of the present invention to provide a lightweight headset which can be comfortably and securely worn, for example, by telephone operators, radio operators, aircraft personnel or other persons using communications systems.

It is another object of the present invention to provide a headset which is capable of being fitted to the user without undue individual attention.

It is a further object of the present invention to provide a headset which is shaped and constructed to be worn comfortably and stably behind the ear of a wearer.

In general, the above and other objects of the invention are achieved by a headset which comprises a housing adapted to be placed behind the ear of the wearer and including an upper curved extension which extends over and engages the top of the ear. A microphone and a receiver are disposed within the housing. An extensible voice tube is attached and positionably supported from the top of the housing with its distal end adapted to be placed adjacent the mouth of the wearer whereby sound can be transmitted from the mouth to the microphone and a flexible acoustic tube is secured to the bottom and provides communication between the auditory canal of the ear and the receiver.

DESCRIPTION OF THE PREFERRED EMBODIMENT

Figure 1:
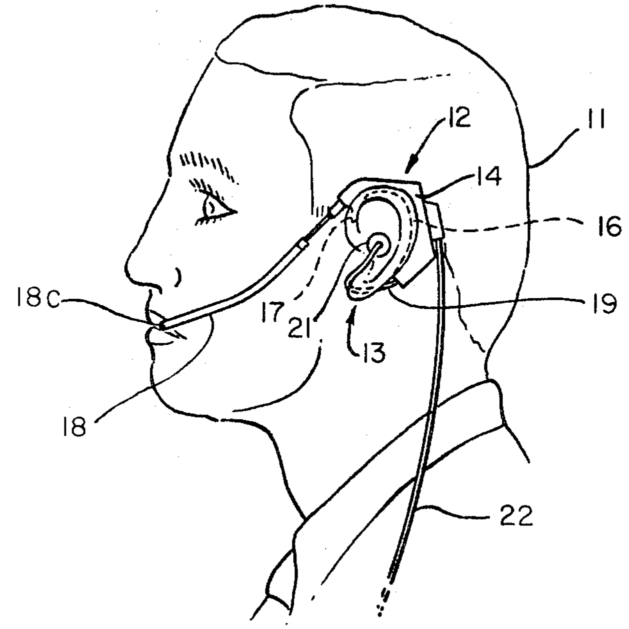
FIG. 1 shows the self-supported headset of the present invention in position upon a user's ear.

Referring to FIG. 1, a user 11 is shown with the headset 12 mounted behind his ear 13. The headset includes housing 14 which fits comfortably behind the ear as indicated by the dotted outline 16. The top of the housing 14 includes a horn or projection 17 which extends over the top of and engages the top of the ear to hold the housing 14 in a place behind the ear.

The top of the housing 14 supports an extensible voice tube 18 which projects forward from the top of the ear towards the mount of the user with the distal end adjacent the mouth. A flexible acoustic tube 19 is secured to the bottom of the housing and carries ear insert 21. The acoustic tube 19 provides communication between the auditory canal of the ear and the receiver. An electrical cable 22 depends downwardly from and is secured to the back of the housing.

Figure 4:
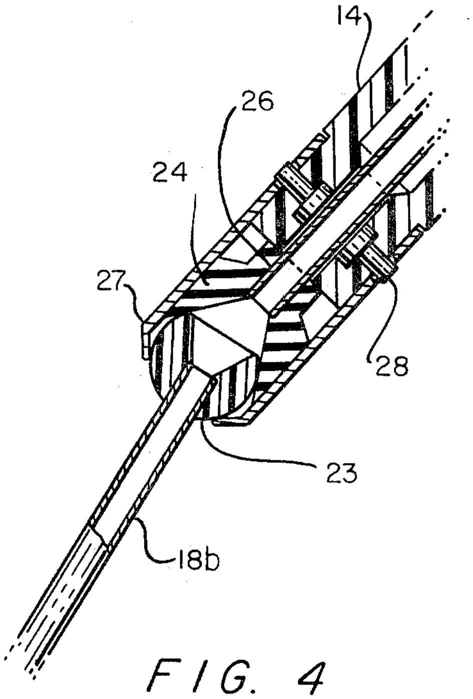
FIG. 4 is an enlarged view taken along the line 4—4 of FIG. 2 showing the ball and socket connection of the voice tube.
Figure 2:
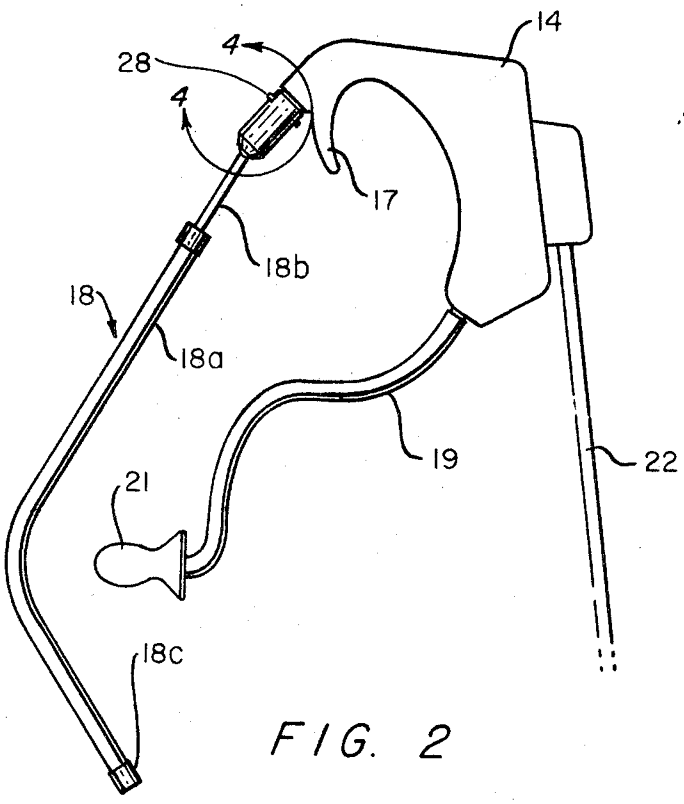
FIG. 2 is an enlarged side elevational view of the headset.
Figure 3:
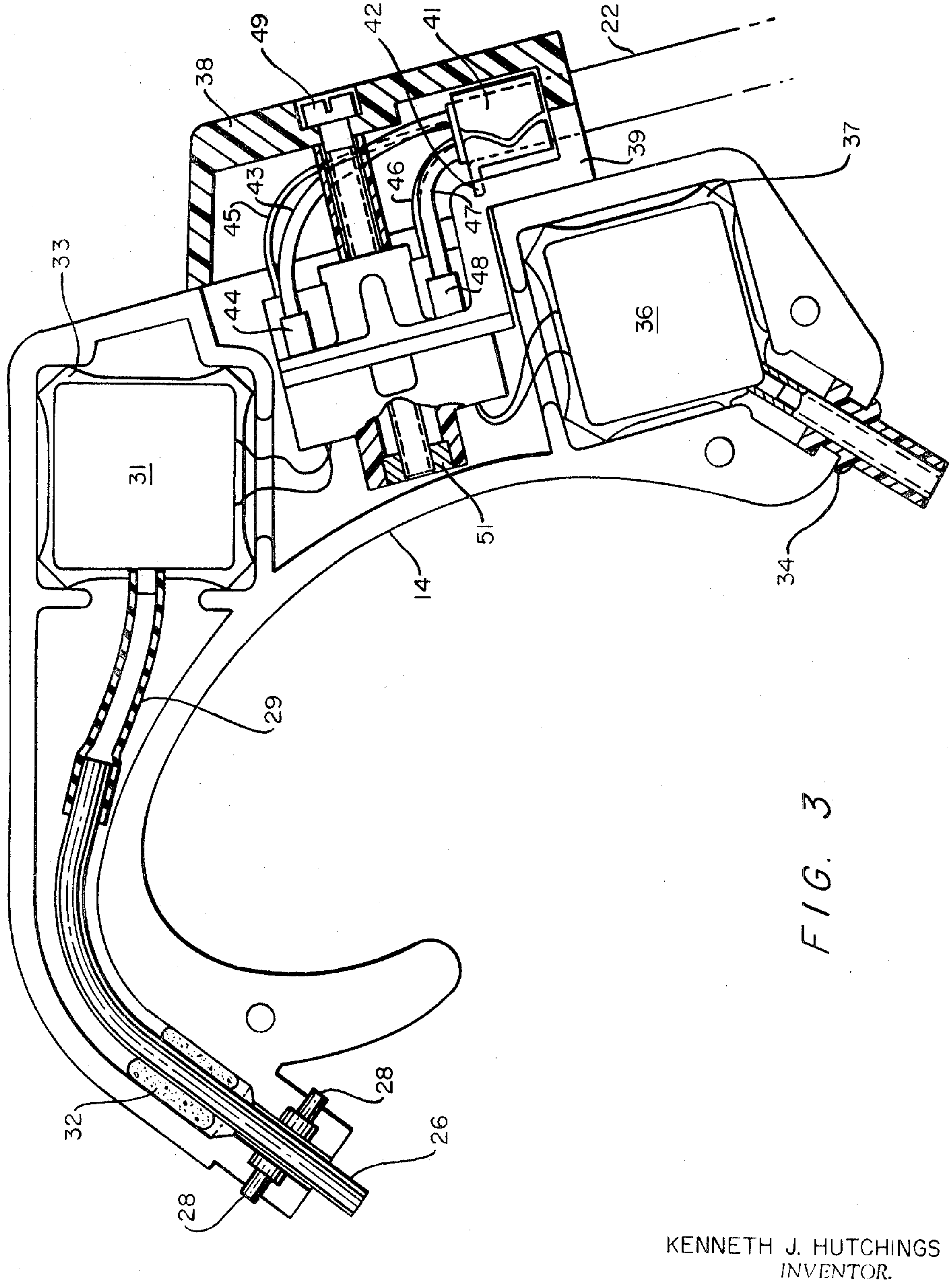
FIG. 3 is an enlarged view of the headset with one side of the housing removed to show the internal position of the microphone and receiver and the attachment of the acoustic tubes to communicate therewith.

Referring more particularly to FIG. 2, the voice tube 18 includes telescoped portions **18*a* and 18*b* whereby the tube 18 may be extended or retracted to place the distal end 18*c* adjacent to the user's mouth. The tube 18 is supported from the housing 14 by a ball and socket joint more clearly shown in FIG. 4. Thus, the portion 18*b* is provided with a ball 23 accommodated within socket 24 fitted to the tube 26. The tubes 18 and 26 provide communication between the user and the associated microphone. A ferrule 27 surrounds the ball and socket 23 and 24 and is adapted to detachably secure the voice tube 18 to the housing 14. This is achieved by inserting the ferrule and rotating the ferrule to engage the pins 28. Referring more particularly to FIG. 3, the tube 26 is connected to a flexible tube 29 secured to the microphone 31. The flexible tube 29 serves to isolate the microphone 31 from any motion of the housing 14. The tube 26 is held in the housing by epoxy 32 and by the housing when the headset is assembled. The microphone transducer 31 is supported by a resilient boot 33** which serves to support the microphone within the housing and to isolate the same from vibrations of the housing and to decouple the microphone from the receiver.

The flexible tube 19 is supported by grommet member 34 and communicates with the receiver 36. The receiver 36 is also resiliently supported within the housing by a resilient boot 37. The boot likewise serves to isolate the receiver from the microphone and from other vibrations.

The housing 14 may comprise two mating parts which are affixed to one another as, for example, by sonic bonding, pins, or the like. The housing provides receptacles for receiving the microphone and receiver-transducer 31, 36 as indicated.

The cable 22 is secured to the housing by a cover 38 acting in conjunction with the member 39 to form an opening and strain relief 41 secured to the cable and having projection 42. The microphone lead wires 43, 45 extend from the cable and are secured to a pair of pins 44. Receiver leads 46, 47 extend from the cable 22 and are secured to a pair of pins 48. The lead wires from the microphone and from the receiver are attached to socket members (not shown) and are connected to the leads 43, 45 and 46, 47 via pins 44 and 48 when the member 39 is seated within the housing. The socket assembly is held by screw 49 which extends downwardly and engages the nut 51.

Referring now to FIGS. 1 and 2, it is seen that the headset is self-supporting on the operator or user's ear. The headset fits behind the ear with the projections 17 extending over and engaging the top of the ear. The telescoped voice tube 18 is secured to the top of the housing by a ball and socket joint whereby the tube can be extended and positioned adjacent the wearer's mouth. The weight of the tube serves to provide a counterclockwise torque to the housing. The flexible tube 19 extends into the ear and provides negligible torque to the housing. However, the cable 22 which depends downwardly has its weight acting on the housing to provide a clockwise torque. The counterclockwise torque provided by the voice tube and the holding action of the protrusion 17 serves to overcome the clockwise torque and to stably hold the headset behind and under the ear of the user. Thus, it is seen that there has been provided a lightweight stably supported headset.

I claim:

1. A headset comprising a housing adapted to be placed behind the ear of a user, said housing including an integral upper curved extension adapted to extend over and engage the top of the ear, a microphone disposed in and near the top of said housing, a forwardly extending voice tube communicating with said microphone and positionably secured to the upper extension of said housing, said voice tube being adapted to have its distal end positioned adjacent the user's mouth, a receiver disposed in and near the bottom of said housing, and a flexible tube secured to the bottom of the housing and adapted to provide communication to the auditory canal of the user's ear.

2. A headset as in claim 1 including a cable secured to the back of said housing for connection to the microphone and receiver.

3. A headset as in claim 1 in which said voice tube is supported from the housing by a ball and socket joint.

4. A headset as in claim 3 in which said voice tube includes first and second telescoped sections.

5. A headset comprising a housing, a microphone and a receiver disposed in said housing, said housing being shaped to fit behind the ear of a user, said housing including an upper curved extension adapted to extend over and engage the top of the ear, a forwardly extending voice tube secured to the upper portion of the housing adjacent said curved extension with its distal and adapted to be positioned adjacent the wearer's mouth, said curved extension bearing on the ear whereby the weight of the voice tube provides a torque which counteracts the torque introduced by the weight of the housing to balance the headset and securely hold the same on a wearer's ear.

6. A headset as in claim 5 including a cable secured to the back of the housing and depending downwardly therefrom providing an electrical connection to the microphone and receiver.

7. A headset as in claim 5 including a flexible tube secured to the bottom of the housing and adapted to provide communication between the auditory canal of the user and the receiver.